April 2, 1968 R. H. MARTIN ETAL 3,376,441
LINEAR INDUCTION MOTOR ACTUATOR WITH
ELECTROMAGNETIC DETENT
Filed July 22, 1965 2 Sheets-Sheet 1
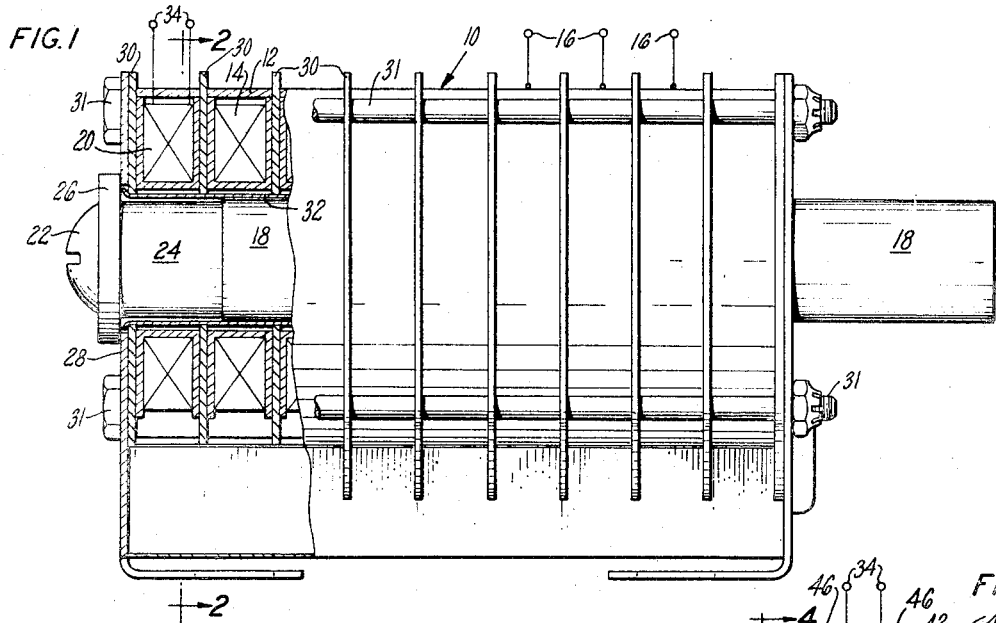
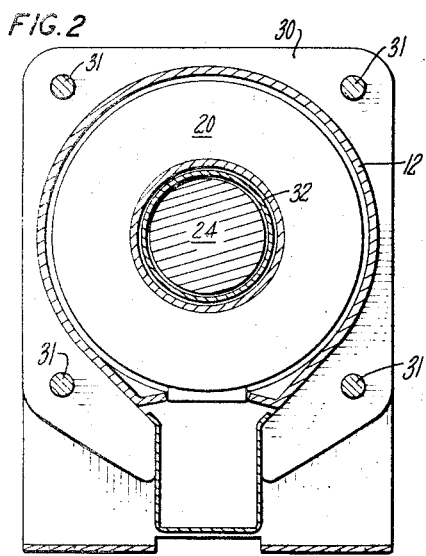
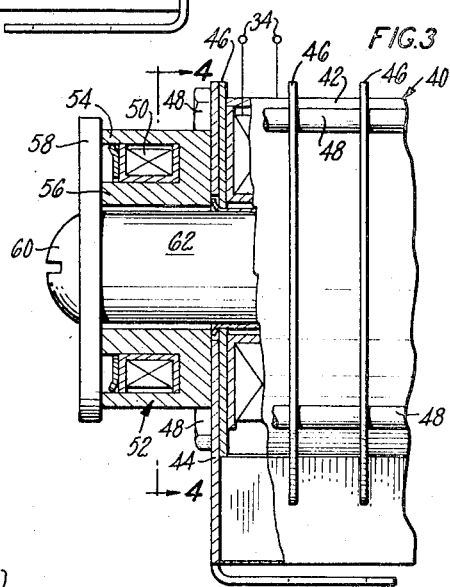
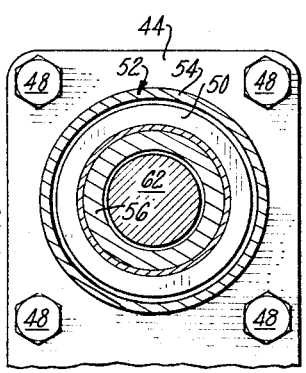
INVENTORS
ROBERT H. MARTIN
F. NORMAN WROBLE
BY Lindsey, Prutzman and Hayes
ATTORNEYS United States Patent Office  
3,376,441  
Patented Apr. 2, 1968

3,376,441
LINEAR INDUCTION MOTOR ACTUATOR WITH ELECTROMAGNETIC DETENT

Robert H. Martin, Bristol, and Francis Norman Wroble, Wethersfield, Conn., assignors to Skinner Precision Industries, Inc., New Britain, Conn., a corporation of Connecticut
Filed July 22, 1965, Ser. No. 474,122
6 Claims. (Cl. 310—13)

ABSTRACT OF THE DISCLOSURE

Mechanism comprising a linear induction motor having a stator, an electromagnet coil on the stator, a movable rod-armature including an end core of magnetic material, means for selectively applying AC power to the stator, and means for selectively applying DC power to the electromagnet when the AC power is removed from the stator.

---

This invention relates generally to linear induction motor actuators and has as a principal object, the provision of a linear induction motor actuator whose movable member is selectively fixed in position when the stator of the actuator is de-energized.

Another object of this invention is to provide a reversible A.C. linear induction motor actuator with an electromagnetic detent to lock the movable member in a predetermined fixed position when the A.C. stator of the actuator is de-energized.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a partial cross sectional view of a preferred embodiment of a linear induction motor actuator with an electromagnetic detent;

FIG. 2 is a cross sectional view taken along lines 2—2 of FIG. 1;

FIG. 3 is a partial cross sectional view of a second embodiment of this invention;

FIG. 4 is a cross sectional view taken along lines 4—4 of FIG. 3;

Figure 5:
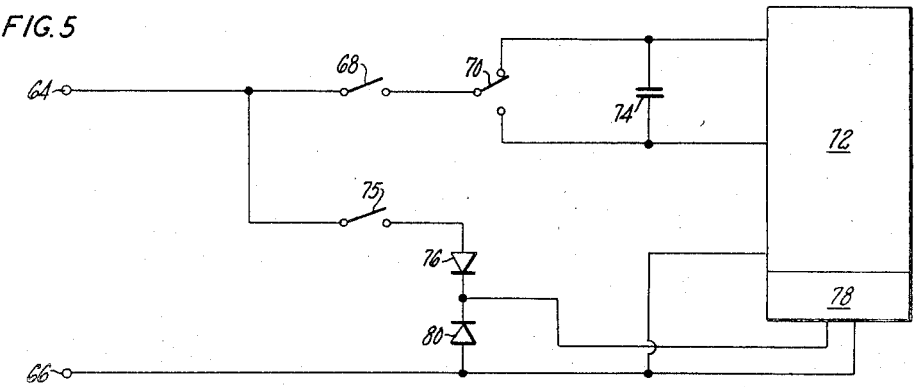
FIG. 5 is a schematic diagram of a circuit for operating a single-phase linear induction motor actuator having an electromagnetic detent.

Shown in FIGS. 1 and 2 is a reversible linear induction motor actuator generally designated by the reference numeral 10. A housing 12 encloses a plurality of stator coils, such as coil 14, forming the field or stator of the actuator. Single-phase or three-phase A.C. power, according to the design of the actuator, may be applied to the A.C. terminals 16. If single-phase is used, only two terminals are necessary. If three-phase is used, then three terminals are required. When the stator is energized from a suitable source of A.C. power, the actuator rod-armature 18 moves linearly to the left or right through the stator field coils. In FIG. 1, the rod 18 is shown in its right limit position. The rod 18 consists of a copper sleeve on a soft magnetic steel core.

The electromagnetic detent is provided by a D.C. electromagnet exciting coil 20 also mounted within housing 12 adjacent stator coil 14. Fixed to the left end of rod 18 by a screw 22 is a soft magnetic steel core plunger 24 which functions as the armature for the electromagnet coil 20. Plunger 24 has a flange 26 which engages the actuator end plate 28 when rod 18 is in its right limit position as shown. End plate 28 functions as a seat for the core armature 24 of the electromagnet. Flux return plates 30 separate all of the coils within housing 12. Four long bolts 31 extend through all the end plates and flux return plates to clamp the stator coils and electromagnet coil 20 in a unitary assembly within housing 12. Rod 18 travels within a nonmagnetic bearing tube 32 which is fixed to housing 12 and extends through the centers of D.C. exciting coil 20 and the A.C. stator coils of actuator 10. Direct current may be selectively applied to terminals 34 from a suitable source (not shown) of D.C. power to energize electromagnet coil 20.

Electromagnet coil 20 and core armature 24 provide the electromagnetic detent action for the linear induction motor actuator 10. If it is assumed that A.C. power is applied to terminals 16 and rod 18 has just moved from its left limit position to the right limit position as shown in FIG. 1, then the rod 18 may be locked in the right limit position by energizing electromagnet coil 20 with direct current. The flux from coil 20 attracts and clamps flange 26 of armature 24 to the actuator end plate 28. Magnetic flux from coil 20 passes through plates 30, end plate 28, flange 26 and armature 24. The A.C. power may now be removed from the stator of linear actuator 10 and rod 18 will remain fixed in its right limit position with flange 26 clamped against end plate 28.

The advantage of such an electromagnetic detent is that the D.C. power required to produce a given holding force in armature 24 is much less than the A.C. power required by the stator coils of actuator 10 to produce the same holding force by induction motor action in rod 18. Such an advantage is important in the case where a given size of linear actuator can be operated only intermittently to produce a required output force because of maximum temperature limitations of stator coil insulation. The addition of the electromagnet provides a means for obtaining a large magnitude holding force on a continuous duty basis since only a fraction of the power is required by the electromagnet coil to produce an equivalent holding force. The use of the electromagnetic detent is particularly useful in applications requiring that the linear induction actuator have a long stroke, short response-time linear motion, long-time fixed position holding or clamping at the stroke limit, and linear motion which is electrically reversible.

FIGS. 3 and 4 show a second embodiment of this invention wherein the electromagnetic detent is added to an existing linear actuator, whereas in the embodiment of FIGS. 1 and 2, the electromagnet coil 20 is an integral part of the linear actuator 10 and is assembled at the factory within a single housing 12. In the second embodiment, housing 42 encloses only the A.C. stator of the linear actuator including the left end plate 44 and the flux return plates 46. The field coils and magnetic plates are clamped in an assembly with housing 42 by four long bolts 48.

Electromagnet coil 50 is enclosed in a separate magnetic steel housing 52 which in turn is fixed by welding, for example, to end plate 44. Annular portions 54 and 56 of housing 52 extend outwardly therefrom to form a seat against which the electromagnet armature 58 is clamped when coil 50 is energized. In this case, armature 58 is a soft magnetic steel plate fixed by a screw 60 directly to the composite steel and copper rod 62 of the linear actuator 40. In operation, coil 50 may be energized with direct current to clamp plate armature 58 against seats 54 and 56 to lock actuator rod 62 in the right limit position when the stator is de-energized in the manner described in connection with the first embodiment and as illustrated in FIGS. 3 and 4.

FIG. 5 shows a circuit schematic diagram showing the manner in which the linear actuator with an electromagnetic detent may be driven from a single-phase A.C. line. Single-phase A.C. power is applied across the terminals 64 and 66 and through a main stator switch 68 and a stator phase control switch 70 to the linear actuator stator represented by a block 72. A phase shift capacitor 74 is connected across the stator 72. Terminal 64 is also connected through an electromagnet coil switch 75 and a diode 76 to one side of the electromagnet coil represented by block 78. A diode 80 is connected across the coil 78. The opposite poled diodes 76 and 80 act as a rectifier so that only direct current flows through coil 78.

In operation, when the linear actuator is to be energized, detent coil switch 75 is open and the main stator switch 68 is closed and the phase switch 70 is in either one of its positions depending upon the direction in which it is desired to move the rod of the actuator by induction motor action. When the rod reaches the limit position in which it is desired to lock it, detent coil switch 75 is closed to energize the electromagnetic coil with direct current, and the main stator switch 68 may then be opened.

Figure 6:
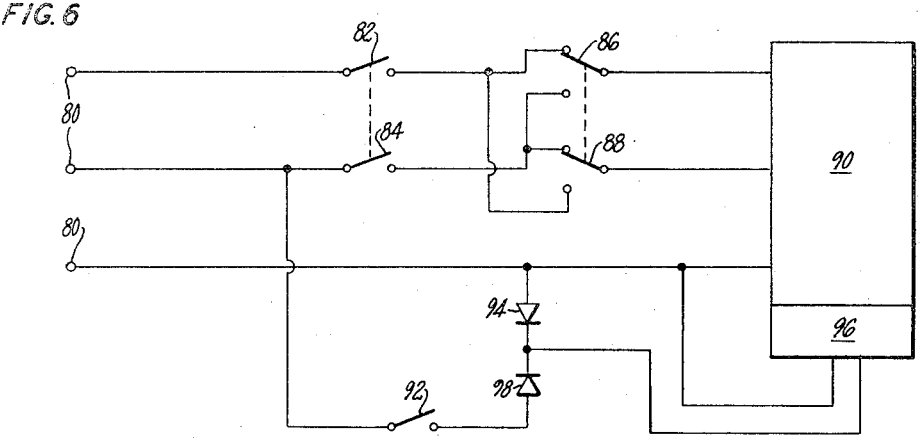
FIG. 6 is a schematic diagram of a circuit for operating a three-phase linear induction motor actuator having an electromagnetic detent.

FIG. 6 shows a circuit diagram for three-phase operation of a linear induction motor actuator whose stator is designed for three-phase voltage. Three-phase power is applied to terminals 80 and via main stator switches 82 and 84 and phase switches 86 and 88 to the linear actuator stator represented by a block 90. One side of an electromagnet coil switch 92 is connected to one of the A.C. input terminals, and the other side of this switch is connected through a diode 94 to one side of the electromagnetic detent coil represented by a block 96. Another diode 98 is connected across the electromagnetic coil. Diodes 94 and 98 function to rectify the A.C. current so that only direct current can flow through electromagnet coil 96. The actuator may be moved linearly by induction motor action in a desired direction by closing switches 82 and 84 and placing switches 86 and 88 in their appropriate positions to obtain the desired direction of movement. When it is desired to lock the actuator rod in a predetermined position, such as a limit position, detent coil switch 92 is closed to energize the electromagnet coil 96 with direct current, and the main power switches 82 and 84 may be opened to interrupt the A.C. supply to the stator 90. However, by virtue of the electromagnetic detent action of coil 96, the plunger of the actuator will remain locked in place.

As will be apparent to persons skilled in the art, various modifications and adaptations of the structure above described will become readily apparent without departure from the spirit and scope of the invention, the scope of which is defined in the appended claims.

We claim:

1. In a reversible linear induction motor comprising a stator, a movable rod-armature, and means to apply alternating current power to said stator to move said rod-armature by induction motor action, the improvement comprising a core of magnetic material on one end of said rod-armature, an electromagnet coil on said stator and surrounding said core when said rod-armature is in a predetermined position, and means to apply direct current power to said coil to hold said rod-armature in said predetermined position when the alternating current power is removed from said stator.

2. The invention defined in claim 1 further comprising a magnetic housing enclosing said stator and said coil.

3. The invention defined in claim 2 further comprising a magnetic end plate on at least one end of said housing, said core seating on said end plate when said rod-armature is in said predetermined position.

4. The invention defined in claim 3 wherein said core has a flange which seats on said end plate.

5. The invention defined in claim 1 further comprising a first magnetic housing enclosing said stator and a separate second magnetic housing supporting said coil, said second housing being fixed to one end of said first housing.

6. A mechanism comprising a linear induction motor having a stator member, an armature member, and means for applying alternating current power to the stator member to effect movement of the members relative to each other, an electromagnet mounted on one of the members, the other of the members having a core of magnetic material, and means for applying direct current power to the electromagnet for fixedly holding the members relative to each other when the alternating current power is removed from the stator member.

References Cited

UNITED STATES PATENTS

| 2,112,264 | 3/1938 | Bowles et al. | 310—13 XR |
| 3,179,867 | 4/1965 | Delgado | 310—13 XR |

MILTON O. HIRSHFIELD, *Primary Examiner.*

D. F. DUGGAN, *Assistant Examiner.*